United States Patent

[11] 3,628,292

| [72] | Inventor | Charles V. Rue<br>Tiffin, Ohio |
| --- | --- | --- |
| [21] | Appl. No. | 806,653 |
| [22] | Filed | Mar. 12, 1969 |
| [45] | Patented | Dec. 21, 1971 |
| [73] | Assignee | International Telephone & Telegraph Corp.<br>New York, N.Y. |

[54] ABRASIVE CUTTING WHEELS
6 Claims, 5 Drawing Figs.

[52] U.S. Cl. ...................................................... 51/206 R,
125/15
[51] Int. Cl. ..................................................... B24d 5/12,
B24d 7/02
[50] Field of Search ........................................ 51/204,
206, 395, 396; 125/15

[56]            References Cited
UNITED STATES PATENTS

| 2,775,854 | 1/1957 | Klingspor ..................... | 51/206 |
| 3,009,456 | 11/1961 | Fessel .......................... | 51/206 X |
| 1,113,780 | 10/1914 | Griesche et al. .............. | 125/15 |
| 2,811,960 | 11/1957 | Fessel .......................... | 125/15 |

*Primary Examiner*—Othell M. Simpson
*Attorneys*—C. Cornell Remsen, Jr., Walter J. Baum, Percy P. Lantzy, J. Warren Whitesel, Delbert P. Warner and James B. Raden

ABSTRACT: Cutting wheels are provided having an abrasive matrix including a plurality of abrasive grains and a resinous bonding agent. The cutting wheels have bosses on both sides of the wheel. The bosses are alternately arranged with intervening grooves on both sides of the wheel and extend in a generally radial direction.

PATENTED DEC 21 1971 3,628,292

INVENTOR
C. V. RUE
BY
James B. Raden
ATTORNEY 3,628,292

ABRASIVE CUTTING WHEELS

This invention relates to new and improved cutting wheels. More particularly, it relates to new and improved resinoid bonded abrasive cutting wheels having a plurality of radially extending bosses on the surface thereof.

There are two types of bonded abrasive cutting wheels which are known in the art. The two types are smooth-sided wheels and rough-sided wheels.

Smooth-sided cutoff wheels are produced by pressing a mixture of abrasive and resinoid bond between smooth steel plates to provide a cutting wheel having relatively smooth sides.

Rough-sided cutoff wheels are produced by pressing an abrasive-resinoid bond mixture between steel plates embossed with patterns designed to transfer its pattern in reverse to the sides of the pressed wheel. Typical patterns are: all over knurling, concentric circular or annular grooves, and spiral grooving extending continuously in a circumferential manner from the hub of the wheel. Another rough-sided pattern commonly used is produced by curing smooth-sided wheels on wire mesh. Still another method of producing a rough side is to press an abrasive plus resinoid bond between steel plates covered with a resilient coating of vinyl, rubber or other similar material. Such a coating permits the abrasive to push into the resilient surface and the bonding material to be pushed into the body of the wheel to impart a rough texture to the entire surface of the wheel.

Generally, the designer of these types of cutting wheels faces several problems. One problem is the need to reduce the amount of time required to cut materials such as metal bars, castings, pipes, structural steel and the like. In order to achieve this, it is necessary to reduce binding of the cutting wheel during cutting. Both the smooth-sided cutting wheels and, to a somewhat lesser degree, the rough-sided cutting wheels exhibit this binding effect. Another problem is the need to reduce the percentage of burn exhibited by these two types of wheels during the cutting process. A still further problem is to maximize the cutting area achieved per area of cutting wheel consumed during the cutting operation. Yet another problem is to provide a wheel which does not become loaded with the cutting residue. This loading reduces the effectiveness and life of the cutting wheel.

It is, therefore, an object of the present invention to provide new and improved resinoid bonded abrasive cutting wheels. These wheels are of either the smooth or rough-sided type.

Another object of the present invention is to provide new and improved resinoid bonded abrasive cutting wheels having means for increasing the rate-of-cut and, thus, reducing the time per cut.

Another object is to provide new and improved bonded abrasive cutting wheels which exhibit a greater degree of freedom from burning.

A still further object is to provide new and improved resinoid bonded abrasive cutting wheels which have a higher steel to wheel ratio representing increased cutting per square inch of wheel consumed during cutting.

Still another object is to provide new and improved resinoid bonded abrasive cutting wheels which exhibit reduced binding effects.

Yet another object is to provide new and improved resinoid bonded abrasive cutting wheels which exhibit reduced loading effects.

Another object is to provide new and improved resinoid bonded abrasive cutting wheels which are more economically manufactured. Also, it is an object to provide cutting wheels which are more economical in use and have increased effectiveness.

Additional objects, if not specifically set forth herein, will be readily apparent to those skilled in the art from the following detailed description of the invention.

According to one aspect of the invention, a cutting wheel is constructed having an abrasive matrix including a plurality of abrasive grains and a resinous bonding agent. This cutting wheel has a pattern embossed on both sides thereof. The pattern consists of a plurality of raised surfaces or bosses extending from a position adjacent to the periphery of the wheel to a position spaced inwardly therefrom. These bosses are oriented in a generally radial direction and are positioned in a manner such that the bosses on one side of the wheel are opposite depressed areas on the opposing side of the wheel.

The above mentioned and other features and objects of this invention and the manner of obtaining them will become more apparent, and the invention itself will be best understood by reference to the following description of embodiments of the invention taken in conjunction with the corresponding drawings, in which.

Figure 1:
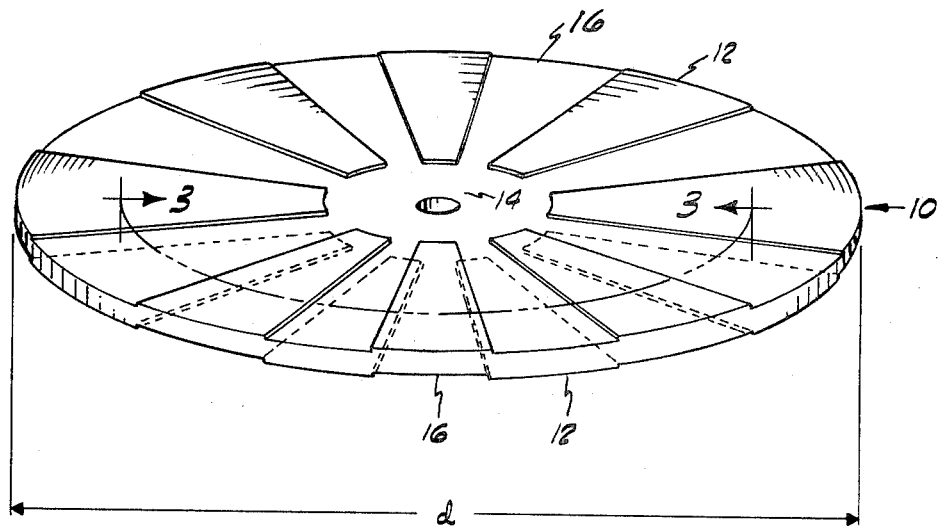
FIG. 1 is a front perspective view of a cutting wheel of the present invention.
Figure 2:
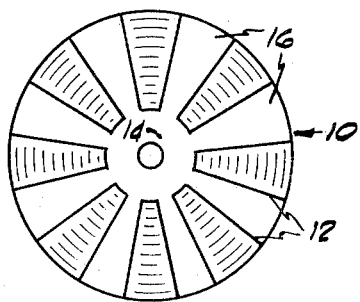
FIG. 2 is a side view of the cutting wheel of FIG. 1.

Briefly, a resinoid bonded abrasive cutting wheel 10 is shown in FIG. 1 and FIG. 2 to illustrate a preferred embodiment exemplifying the principles of the invention. In general, this embodiment includes a circular shaped cutting wheel body, generally indicated as 10, having an abrasive matrix including a plurality of abrasive grains and a resinous bonding agent. The cutting wheel 10 has a plurality of ribs or bosses 12 embossed on both sides thereof. The ribs or bosses 12 extend radially from the position adjacent to the periphery of the wheel 10 to a position 14 inwardly therefrom. These bosses are alternately arranged on both sides of the wheel.

In greater detail, the resinoid bonded abrasive cutting wheel 10 is constructed having a plurality of radially extending spokelike ribs or bosses 12. The bosses 12 are oriented in a radial direction from the periphery of the wheel to a flange area 14. This construction leaves a flat surface at the hub of the wheel for attachment to a drive means by a standard flat mounting flange (not shown). An alternately arranged series of bosses 12 and depressed areas or grooves 16 is provided on each side of the wheel. The bosses 12 and grooves 16 are positioned on the two sides of the wheel 10 in a manner such that the bosses 12 on one side of the wheel are directly opposite grooves 16 between bosses 12 on the opposing side of the wheel 10 and vice versa.

Figure 3:
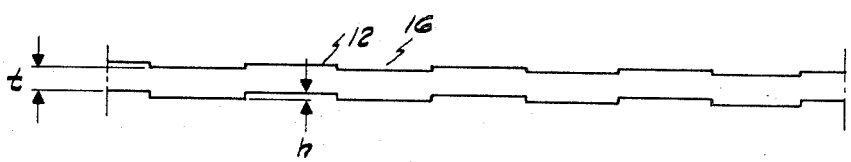
FIG. 3 is a cross-sectional view of the cutting wheel taken along the line 3–3 of FIG. 1.

In FIG. 3 the configuration of the spokelike bosses 12 is shown from a cross-sectional view of the cutting wheel 11 (taken along line 3–3 of FIG. 1). As here shown, the wheel 10 has a thickness $t$ with upstanding bosses 12 having a height $h$ measured from the planar surface of the wheel to the top of the embossed projection from the surface of the wheel. The overall diameter $d$ of the wheel 10 is shown in FIG. 1.

In one exemplary embodiment actually built and tested, the thickness $t$ of the wheel was 0.122 inch and the height $h$ was 0.014 inch. The overall diameter $d$ of this wheel was 16 inches.

In a preferred embodiment of the invention, the height $h$ of the bosses 12 should be less than about 35 percent of the thickness $t$ of the wheel, and in a more preferred embodiment in the range of about 5—20 percent.

The cutting wheels of the present invention may be constructed by forming an abrasive matrix wherein a plurality of abrasive grains are mixed with resinoid bonding agents and pressing the mixture between flat steel plates. The resulting pressed wheel is then repressed between heated steel plates bearing the desired radial bosses to emboss this pattern on the surface of the wheel. The cutting wheel thus produced is of the smooth-sided type. In addition to the bosses on the surface of the wheel, any further degree of roughness may be imparted to the surface of the wheel. If desired, for example, concentric circles may be pressed into the bosses by one of the presently known methods as described above.

The cutting wheels may be of unitary construction or molded with one or more layers of mesh reinforcement as desired.

A variety of abrasive grains can be employed in the construction of the wheel. Exemplary of abrasive grains which can be employed are various types of aluminum oxides, silicon carbides, aluminum-zirconium oxides, zirconium oxides and the like and mixtures thereof.

Various resinoid bonds can be employed herein, although phenolformaldehyde resins are preferred. Examples of other resinoid bonds which may be employed are other thermosetting resins such as polyurethane, polyimids, urea formaldehydes and mixtures thereof. Additionally, rubber-resin mixtures may be employed as the bonding agent, for example, phenolformaldehyde modified with natural or synthetic rubber.

It is thought that the advantages of the subject invention will be readily apparent from a study of the preceding disclosure and the attached drawings. More specifically, the inventive cutting wheels herein described provide means for achieving an interrupted cutting action. Means are also provided for inducing small, high-frequency vibrations between the workpiece and the cutting wheel during cutting. In greater detail, the ribs 12 and grooves 16 on both sides of the wheel are positioned in an alternating pattern. Consequently, at a given point of time, as the wheel rotates in the cutting process, a boss 12 on one side of the wheel will be in contact with the workpiece. At this same point in time, a groove 16 on the other side of the wheel will be in position and this opposed side of the wheel will not be in contact with the workpiece. This effect will alternate constantly as the wheel rotates during the cutting process. The bosses 12 of one side of the wheel will enter into the cutting cycle as the other side is exiting therefrom and vice versa. This alternating action will cause the desirable interrupted cutting action. Additionally, it will cause the equally desirable small, high frequency vibrations to be induced between the workpiece and the cutting wheel. The advantages of these effects are that the inventive wheel will cut more freely and faster, and with less burning, than conventional wheels.

Means are also provided in the construction of these cutting wheels for expelling the cutting residue from the surface of the wheel 10. More specifically, the construction of the wheel 10 with the alternating grooves 16 between the ribs 12 provides channels on the surface of the wheel. The centrifugal force of the rotating wheel will cause the cutting residue to be hurled into these channels and thereby expelled from the cutting wheel surface. An advantage of this construction is that loading of the wheel surface is substantially reduced. This adds to the effectiveness of the wheel and to the life span of the wheel.

Figure 4:
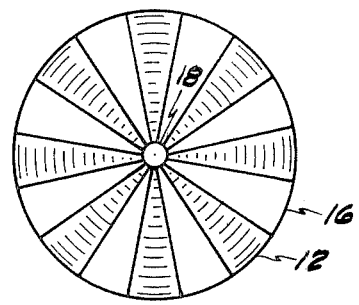
FIG. 4 is a side view of a modified embodiment of the inventive cutting wheel.

A second embodiment of the resinoid bonded abrasive cutting wheels is illustrated in FIG. 4. In this embodiment, the bosses 12 extend radially from the periphery of the wheel all the way to the arbor hole 18. Otherwise, the construction of this wheel is similar to the wheel of FIGS. 1–3. The radially extending bosses 12 are alternately arranged with intervening depressed areas or grooves 16 on each side of the wheel. The bosses 12 on one side of the wheel are directly opposite grooves 16 on the opposing side of the wheel and vice versa. The cutting wheel of FIG. 4 exhibits the same desirable attributes as the wheel illustrated in FIGS. 1–3.

Means are provided in this construction for achieving an interrupted cutting action, an induced vibration and a reduction in loading. Additionally, mating recesses can be machined into the mounting flange (not shown) to correspond with the bosses on the surface of the wheel. The meshing of the wheel bosses 12 and the mating flange recesses provide an advantageous positive no-slip drive as the wheel is driven in a rotating motion.

Figure 5:
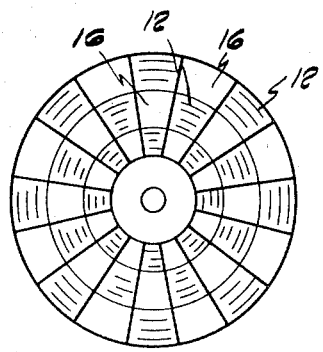
FIG. 5 is a side view of a second modified embodiment of the inventive cutting wheel.

Figure 5 illustrates still another embodiment of the inventive cutting wheel. In this case, the bosses 12 are arranged in a checkerboard type configuration. The bosses 12 are directly opposite depressed areas 16 on the opposing side of the wheel and vice versa.

In this embodiment, as the wheel is consumed by the cutting action, there is always an alternating boss-depressed area configuration which provides the interrupted cutting action, induced vibration and reduced loading features as described above. This embodiment of the invention has the advantage that this construction gives the wheel added strength and resistance from shattering.

That the advantages attributed to the cutting wheels of this invention are true may be demonstrated by the following example.

Four standard batches of abrasive mix were prepared for hot-pressing into four 16 inch diameter cutting wheels. The batch compositions were as follows:

| | |
|---|---:|
| Aluminum oxide abrasive (24 grit) | 3,805 g. |
| Powdered phenolformaldehyde resin | 842 g. |
| Iron pyrites (−100 mesh) | 1,177 g. |
| Lime | 175 g. |
| Creosote oil | 47 cc. |

Each of the four batches was then pressed into individual cutting wheels. One batch, hereinafter termed A, was formed into a standard rough sided cutting wheel which has been commonly accepted as the best wheel known heretofore. This control wheel was produced by pressing between concentrically grooved plates (16 grooves/inch).

The other three batches, hereinafter termed B, C & D, were formed into cutting wheels according to the present invention. These wheels had pressed into surface thereof 8, 8, and 16 bosses respectively. The bosses of the wheel B had a height, hereinbefore defined as $h$, of 0.03 inch. The height of the bosses on wheels C and D were each 0.014 inch.

All four wheels were hot pressed at 350° F. for 10 minutes. This heating period was followed by a 20 hour cure at 350° F. The cured wheels were then truedup for the cutting test.

The cutting test was performed on a 15 H. P. Wallace cutoff machine, a chop type cutting machine for slicing metal blocks. Cold rolled steel bars were cut into 2 inch × 2 inch cross section bars by the four cutting wheels. The time per cut and the percent burn were recorded. Additionally, after 10 cuts had been made with each of the wheels, the wheel diameters were determined and compared with the original diameters of the wheels. The square inches of steel cut per square inch of wheel consumed was then calculated (expressed hereinafter as the steel-to-wheel or S/W ratio). The results of this testing are tabulated below.

TABLE

| Cutting Wheel | Time/cut (seconds) | % Burn | S/W Ratio |
|---|---|---|---|
| A (control) | 14.1 | 52 | 0.89 |
| B | 11.5 | 25 | 2.21 |
| C | 10.7 | 33 | 1.77 |
| D | 9.9 | 4 | 2.30 |

As will be recognized from the above tabulated data, the inventive wheels substantially outperformed the standard wheel. The wheels of the present invention evidenced a considerable increase in the rate-of-cut, a much higher freedom from burn and a substantial increase in the area cut per area of wheel consumed in cutting.

While principles of the invention have been described above in connection with specific apparatus and applications, it is to be understood that this description is made only by way of example and not as a limitation of the scope of the invention.

I claim:

1. A resinoid bonded abrasive cutting wheel comprising a circular wheel body having a plurality of integral spokelike ribs embossed on both sides of said wheel body, said ribs extending radially from a position adjacent to the periphery of said wheel body to a position inwardly therefrom, said ribs being alternately arranged with intervening grooves on each side of said wheel body, said grooves for receiving and expelling cutting residue from the surface of said wheel responsive to the centrifugal force created by the rotation of said wheel during a cutting operation, said ribs being positioned directly opposite depressed areas on the opposing side of said wheel body, said ribs being positioned to cause interrupted cutting action and for inducing small, high-frequency vibrations between the workpiece and said cutting wheel during said cutting operation.

2. The cutting wheel of claim 1 wherein the height of the ribs is less than 35 percent of the thickness of said wheel body.

3. A cutting wheel including means for producing an interrupted cutting action, means for inducing vibrations between the workpiece and said cutting wheel, and means for expelling cutting residue from the surface thereof, comprising: an abrasive matrix including a plurality of abrasive grains and a resinous bonding agent, and having integral bosses on both sides of said wheel, said bosses being alternately arranged with intervening grooves on both sides of said wheel, the height of said bosses being about 5–20 percent of the thickness of said wheel.

4. The cutting wheel of claim 3 wherein said bosses extend from a position adjacent to the periphery of said wheel to a position spaced inwardly therefrom and oriented in a generally radial direction.

5. The cutting wheel of claim 4 wherein said bosses are positioned directly opposite depressed areas on the opposing side of said wheel.

6. The cutting wheel of claim 5 wherein the resinous bonding agent is a phenolformaldehyde resin.

* * * * *